US012664558B2

(12) United States Patent (10) Patent No.: US 12,664,558 B2

Singh et al. (45) Date of Patent: Jun. 23, 2026

(54) INTELLIGENT CALL ANALYSIS AND ORCHESTRATION USING MACHINE LEARNING, GENERATIVE ARTIFICIAL INTELLIGENCE (AI), AND DISTRIBUTED LEDGERS

(71) Applicant: Bank of America Corporation, Charlotte, NC (US)

(72) Inventors: Shailendra Singh, Maharashtra (IN); Sneha Padiyar, East Mumbai (IN); Krithika Viswanathan, Chennai (IN); Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 194 days.

(21) Appl. No.: 18/242,673

(22) Filed: Sep. 6, 2023

(65) Prior Publication Data

US 2025/0078089 A1 Mar. 6, 2025

(51) Int. Cl.
| | |
|---|---|
| *G06Q 30/015* | (2023.01) |
| *G06N 20/20* | (2019.01) |
| *G10L 15/06* | (2013.01) |
| *G10L 15/22* | (2006.01) |

(Continued)

(52) U.S. Cl.
CPC ........... *G06Q 30/015* (2023.01); *G06N 20/20* (2019.01); *G10L 15/063* (2013.01); *G10L 15/22* (2013.01); *G10L 25/18* (2013.01); *G10L 25/63* (2013.01); *G10L 2015/0635* (2013.01)

(58) Field of Classification Search
CPC . G06Q 30/01; G06Q 30/015–016; G06Q 3/51
See application file for complete search history.

(56) References Cited

U.S. PATENT DOCUMENTS

| | | |
|---|---|---|
| 6,181,938 B1 | 1/2001 | Salmela et al. |
| 6,850,600 B1 | 2/2005 | Boeckman et al. |
| 7,023,837 B1 | 4/2006 | Srinivasan |

(Continued)

OTHER PUBLICATIONS

Hsu, et al., Performance evaluation of call center agents by neural networks, 2016 30th International Conference on Advanced Information Networking and Applications Workshops (WAINA), IEEE, 2016 (Year: 2016).*

(Continued)

*Primary Examiner* — Daniel Vetter

(74) *Attorney, Agent, or Firm* — Banner & Witcoff, Ltd.

(57) ABSTRACT

A computing platform may detect a live interaction between an agent and a customer. The computing platform may input information of the live interaction into a first machine learning model and a second machine learning model to produce a first solution deviation score and a first emotional deviation score, respectively. The computing platform may compare the first solution deviation score to a solution deviation threshold and the first emotional deviation score to an emotional deviation threshold. Based on detecting that one or more of the solution deviation threshold or the emotional deviation threshold are met or exceeded, the computing platform may initiate one or more corrective actions. The computing platform may update, based on the first solution deviation score and the first emotional deviation score, the first machine learning model and the second machine learning model.

15 Claims, 8 Drawing Sheets

(51) Int. Cl.
    *G10L 25/18*       (2013.01)
    *G10L 25/63*       (2013.01)

(56)          References Cited

U.S. PATENT DOCUMENTS

| | | | |
|---|---|---|---|
| 7,023,979 B1 | 4/2006 | Wu et al. | |
| 7,372,952 B1 | 5/2008 | Wu et al. | |
| 7,536,002 B1 | 5/2009 | Ma et al. | |
| 8,908,678 B1 | 12/2014 | McGonigal et al. | |
| 10,841,424 B1 | 11/2020 | Lemus et al. | |
| 11,070,673 B1 | 7/2021 | Lemus et al. | |
| 11,451,666 B1 * | 9/2022 | Biswas | H04M 3/5183 |
| 11,558,509 B1 | 1/2023 | Jayapalan et al. | |
| 12,223,511 B1 * | 2/2025 | Kumar | G06Q 30/016 |
| 2003/0008642 A1 | 1/2003 | Punjabi | |
| 2004/0174979 A1 | 9/2004 | Hutton et al. | |
| 2005/0286705 A1 | 12/2005 | Contolini et al. | |
| 2007/0116240 A1 | 5/2007 | Foley et al. | |
| 2008/0062997 A1 | 3/2008 | Nix | |
| 2009/0059918 A1 | 3/2009 | Spade et al. | |
| 2009/0279683 A1 | 11/2009 | Gisby et al. | |
| 2010/0046731 A1 | 2/2010 | Gisby et al. | |
| 2012/0045047 A1 | 2/2012 | Million et al. | |
| 2016/0094437 A1 | 3/2016 | On | |
| 2019/0124202 A1 * | 4/2019 | Dubey | G06Q 10/063112 |
| 2019/0253558 A1 * | 8/2019 | Haukioja | H04M 3/5175 |
| 2020/0126545 A1 * | 4/2020 | Kakkar | G10L 25/63 |
| 2020/0195779 A1 * | 6/2020 | Weisman | G06N 5/01 |
| 2023/0230585 A1 * | 7/2023 | Anderson | G06Q 30/015 704/232 |
| 2024/0289789 A1 * | 8/2024 | Matsuda | G06Q 30/015 |

OTHER PUBLICATIONS

Plaza, et al., Machine learning algorithms for detection and classifications of emotions in contact center applications, Sensors, vol. 22, No. 14, 2022, 5311 (Year: 2022).*

* cited by examiner

102

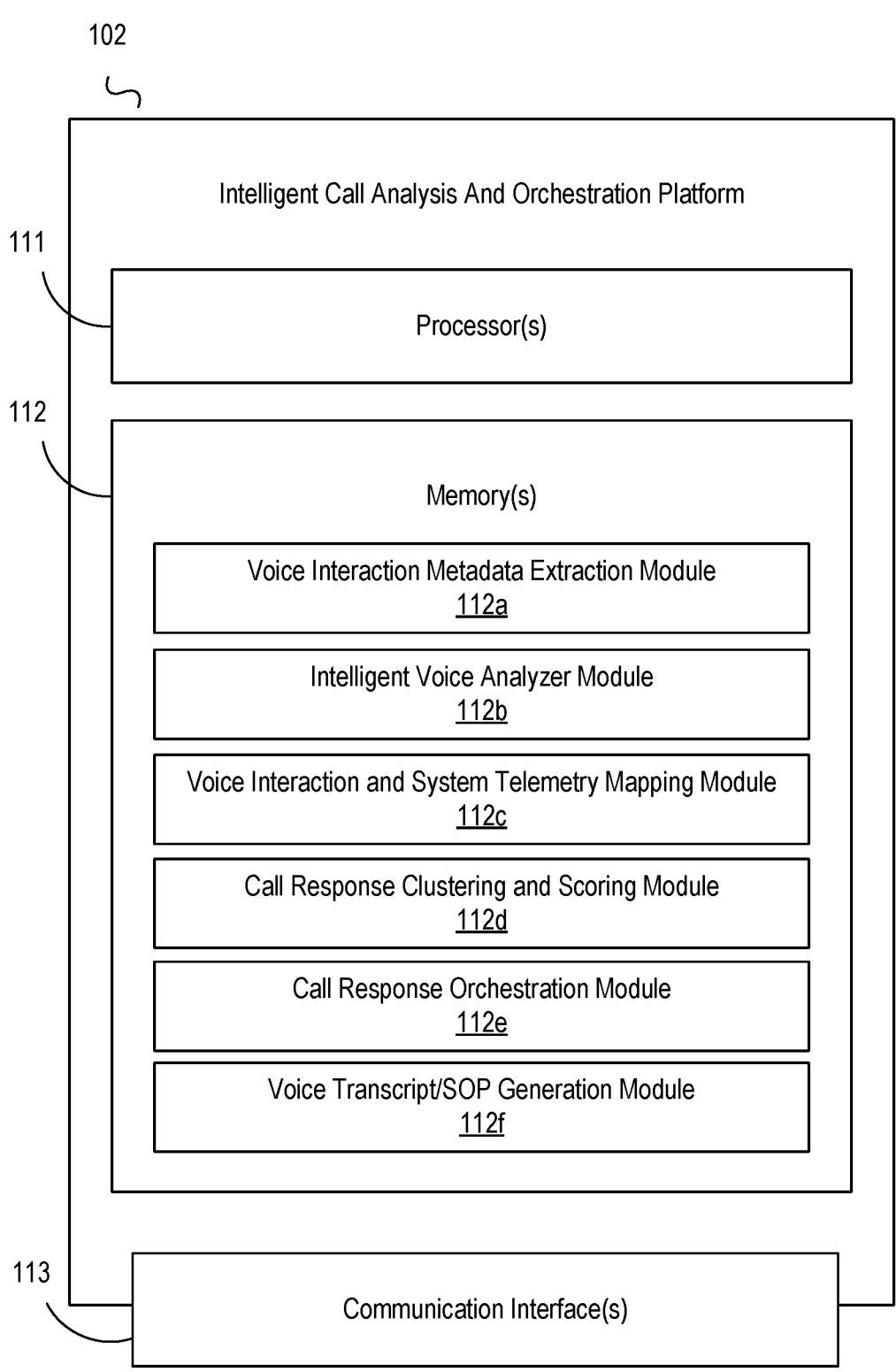

Intelligent Call Analysis And Orchestration Platform

111

Processor(s)

112

Memory(s)

Voice Interaction Metadata Extraction Module
112a

Intelligent Voice Analyzer Module
112b

Voice Interaction and System Telemetry Mapping Module
112c

Call Response Clustering and Scoring Module
112d

Call Response Orchestration Module
112e

Voice Transcript/SOP Generation Module
112f

113

Communication Interface(s)

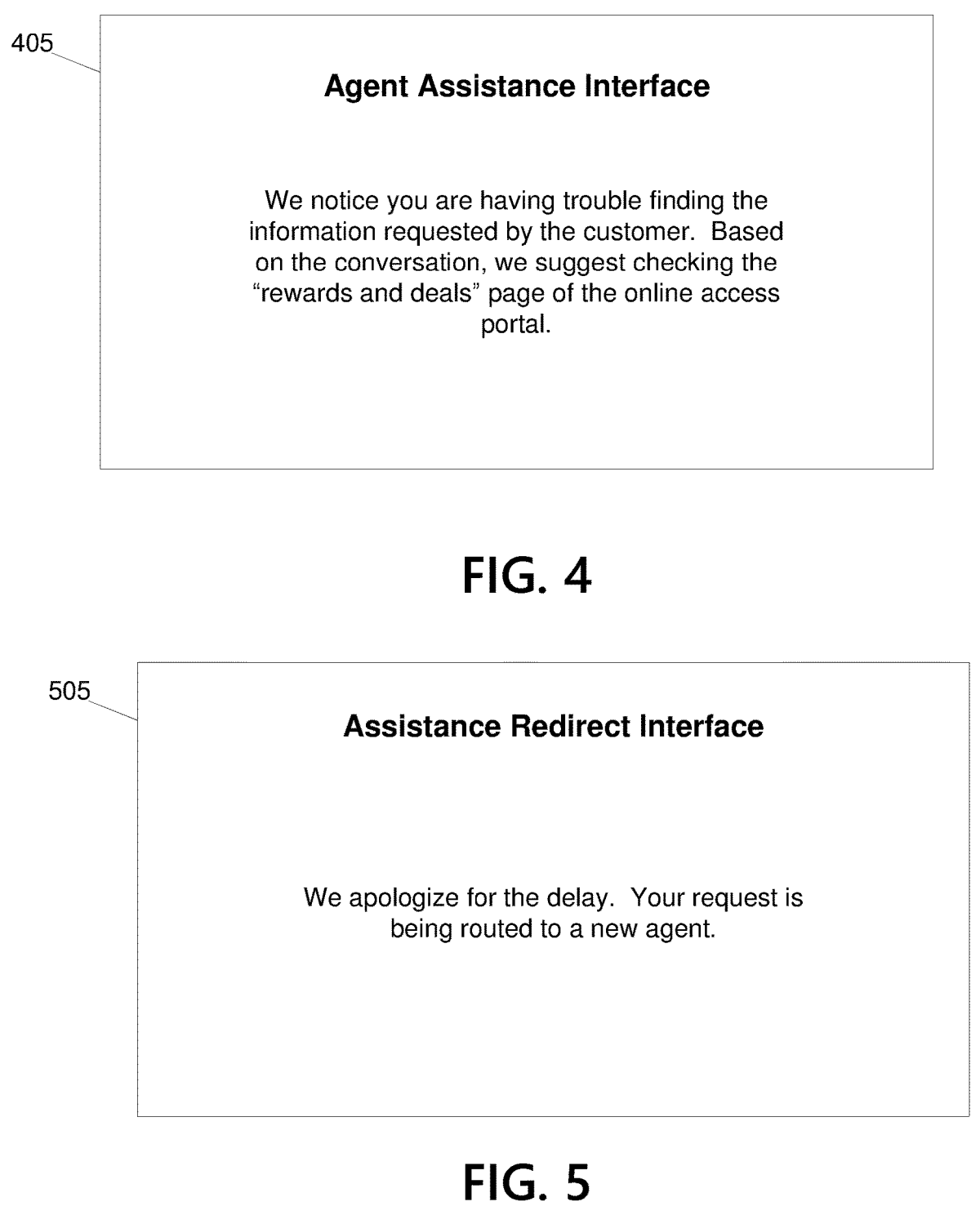

Agent Assistance Interface

We notice you are having trouble finding the
information requested by the customer.  Based
on the conversation, we suggest checking the
"rewards and deals" page of the online access
portal.

Assistance Redirect Interface

We apologize for the delay.  Your request is
being routed to a new agent.

FIG. 5

INTELLIGENT CALL ANALYSIS AND ORCHESTRATION USING MACHINE LEARNING, GENERATIVE ARTIFICIAL INTELLIGENCE (AI), AND DISTRIBUTED LEDGERS

BACKGROUND

In some instances, inbound and outbound calls to an enterprise (e.g., between a customer and an employee) may be monitored. In some instances, however, such monitoring may be error prone and/or result in delayed feedback, which may, e.g., result in poor customer satisfaction. Accordingly, it may be important to provide improved methods for quality assurance and monitoring.

SUMMARY

Aspects of the disclosure provide effective, efficient, scalable, and convenient technical solutions that address and overcome the technical problems associated with call orchestration. In one or more instances, a computing platform having at least one processor, a communication interface, and memory may train, using standard operating procedures (SOP) and historical agent response information, a first machine learning model, which may configure the first machine learning model to output, based on live interaction information, a solution deviation score indicating a degree to which agents are complying with a corresponding SOP. The computing platform may train, using voice spectrograms for historical agent interactions, a second machine learning model, which may configure the second machine learning model to output, based on the live interaction information, an emotional deviation score indicating an emotional state of a corresponding agent. The computing platform may detect a live interaction between an agent and a customer. The computing platform may input information of the live interaction into the first machine learning model and the second machine learning model to produce a first solution deviation score and a first emotional deviation score. The computing platform may compare the first solution deviation score to a solution deviation threshold and the first emotional deviation score to an emotional deviation threshold. Based on detecting that one or more of the solution deviation threshold or the emotional deviation threshold are met or exceeded, the computing platform may initiate one or more corrective actions. The computing platform may update, based on the first solution deviation score and the first emotional deviation score, the first machine learning model and the second machine learning model.

In one or more instances, the first machine learning model may be further trained using a historical voice event interaction sequence log, where historical voice interaction metadata may be mapped to historical telemetry information to produce the historical voice event interaction sequence log. In one or more instances, initiating the one or more corrective actions may include deriving, based on one or more of the first solution deviation score or the first emotional deviation score, the one or more corrective actions, where the one or more corrective actions may be initiated to address a particular issue reflected by the first solution deviation score or the first emotional deviation score.

In one or more examples, the one or more corrective actions may be one or more of: an agent based action or a system based action. In one or more examples, the agent based action may include providing live feedback to the agent to facilitate the live interaction.

In one or more instances, providing the live feedback to the agent may include providing, via a homomorphic encryption layer, the live feedback. In one or more instances, the system based action may include one or more of: updating a first SOP corresponding to the live interaction, updating one or more interface elements corresponding to the live interaction, or routing the live interaction to a different agent.

In one or more examples, updating the first SOP may include: 1) generating, based on the information of the live interaction, a prompt for a generative artificial intelligence (AI) model, and 2) inputting, into the generative AI model, the prompt, which may cause the generative AI model to produce an updated SOP, where the first SOP may be replaced by the updated SOP. In one or more examples, the generative AI model may be one or more of: a knowledge graph, a long short term memory (LSTM) model, a transformer model, or a generative adversarial networks (GAN) model. In one or more examples, the computing platform may identify whether or not a number of agents experiencing a common live interaction problem exceeds a predetermined agent threshold, where updating the first SOP or the one or more interface elements corresponding to the live interaction may be in response to identifying that the predetermined agent threshold is exceeded.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 1A-1B depict an illustrative computing environment for using machine learning, generative artificial intelligence, and distributed ledgers to perform intelligent call analysis and orchestration in accordance with one or more example embodiments;

FIGS. 4-5 depict illustrative user interfaces for using machine learning, generative artificial intelligence, and distributed ledgers to perform intelligent call analysis and orchestration in accordance with one or more example embodiments.

DETAILED DESCRIPTION

Figure 1A:
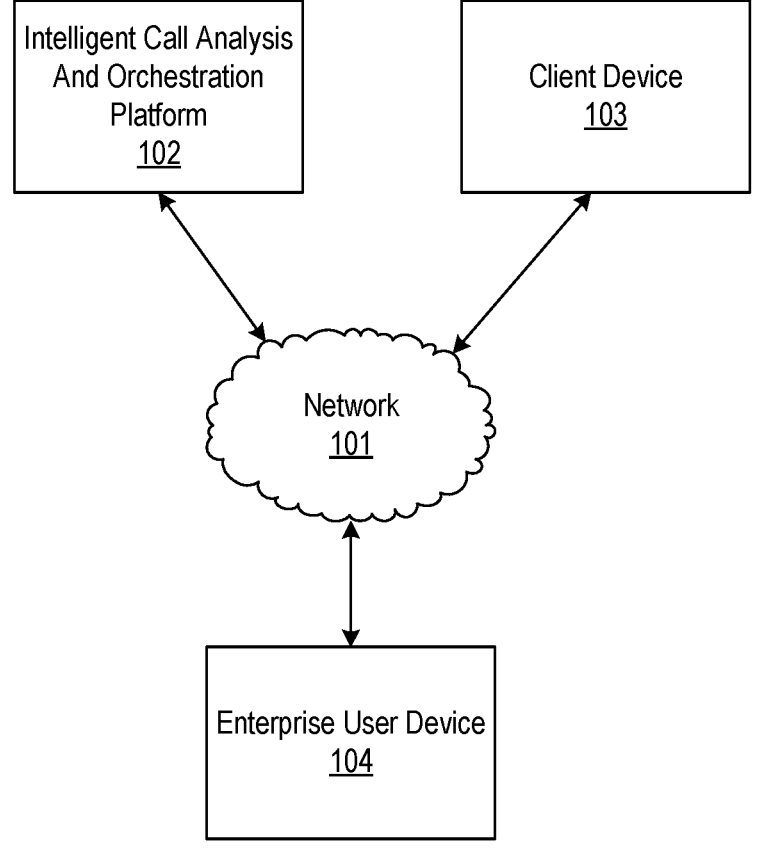

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for intelligent call analysis and orchestration using machine learning, generative artificial intelligence, and distributed ledgers are described herein.

Ensuring customer satisfaction may be a key parameter for call centers. All calls, whether inbound or outbound, may be monitored for call quality by a voice quality assurance (QA) team. Currently, the process may be all manual, where voice QA team associates may hear sample live calls or perform offline call quality assessment and provide feedback to agents. On some occasions, call audit findings may lead to changes in voice related standard operating procedures (SOP) or changes in voice transcripts or changes in agent resource systems. There may be a need to develop a technical procedure where an automated system may listen to live calls between customers and agents and dynamically modify call resources, provide on screen alerts to agents, orchestrate future call routing, and provide automatic call quality scores.

Accordingly, described herein is an intelligent apparatus to analyze real-time call spectrograms during live call sessions between agents and customers, and to provide run time feedback to a call response orchestration system. The method may extract voice metadata features from a spectrogram including a context of a call and other features like dialect, agent stress condition, or the like, and assess a conversation between an agent and a customer.

The method validates voice conversations with SOPs/ scripts and agent interaction responses to information sources (e.g., applications where agents are querying to resolve customer queries). Agent interaction telemetry may be used with a source system to resolve customer queries vis-a-vis voice response, which may be mapped to an agent voice interaction and system telemetry response score. This score may be monitored on a live call, and any significant deviation on the score may trigger a feedback loop to a call response orchestration system. The method may cluster voice interactions across all calls (inbound and outbound) using machine learning algorithms, and may derive a systemic voice interaction issue/pattern/behavior, leveraging an agent voice interaction and system telemetry response score. Smart contracts may trigger autogenerating an agent script including SOPs using generating AI to bridge gaps for future calls. Autogenerated agent scripts/SOPs may be validated via blockchain network consent protocols before getting released to agents.

This method may dynamically update an agent roster based on the agent voice interaction and system telemetry response score, ensuring call quality and productivity. It may also identify customer identity, and create a summary of all its voice interactions with agents, and autogenerate an agent-customer voice interaction feedback summary, leveraging generative AI. This may trigger real time feedback/ alerts for agents during a live call session on their application console/interface based on the agent voice interaction and system telemetry response score.

An entire live agent voice interaction and system telemetry response may be routed on a homomorphic encryption layer to ensure privacy of interactions. These and other features are described in greater detail below.

FIGS. 1A-1B depict an illustrative computing environment for using machine learning, generative artificial intelligence, and distributed ledgers to perform intelligent call analysis and orchestration in accordance with one or more example embodiments. Referring to FIG. 1A, computing environment 100 may include one or more computer systems. For example, computing environment 100 may include an intelligent call analysis and orchestration platform 102, a client device 103, and enterprise user device 104.

As described further below, intelligent call analysis and orchestration platform 102 may be a computer system that includes one or more computing devices (e.g., servers, server blades, or the like) and/or other computer components (e.g., processors, memories, communication interfaces) that may be used to provide call analysis and orchestration services. For example, intelligent call analysis and orchestration platform 102 may be configured to train, host, and/or otherwise maintain machine learning models that may be used to detect deviation in agent solution suggestions, emotional responses, and/or otherwise.

Client device 103 may be and/or otherwise include a laptop computer, desktop computer, mobile device, tablet, smartphone, and/or other device that may be used by an individual (such as a customer/client of an enterprise organization). In some instances, client device 103 may be used to communicate with agents and/or other employees of the enterprise organization. In some instances, client device 103 may be configured to display one or more user interfaces (e.g., assistance redirect interfaces, or the like).

Enterprise user device 104 may be and/or otherwise include a laptop computer, desktop computer, mobile device, tablet, smartphone, and/or other device that may be used by an individual (such as an agent or other employee of an enterprise organization). In some instances, enterprise user device 104 may be used to communicate with clients and/or other customers of the enterprise organization. In some instances, enterprise user device 104 may be configured to display one or more user interfaces (e.g., agent assistance interfaces, or the like).

Although a client device 103 and enterprise user device 104 are shown, any number of such devices may be deployed in the systems/methods described below without departing from the scope of the disclosure.

Computing environment 100 also may include one or more networks, which may interconnect intelligent call analysis and orchestration platform 102, client device 103, enterprise user device 104, or the like. For example, computing environment 100 may include a network 101 (which may interconnect, e.g., intelligent call analysis and orchestration platform 102, client device 103, enterprise user device 104, or the like).

In one or more arrangements, intelligent call analysis and orchestration platform 102, client device 103, and enterprise user device 104 may be any type of computing device capable of sending and/or receiving requests and processing the requests accordingly. For example, intelligent call analysis and orchestration platform 102, client device 103, enterprise user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of intelligent call analysis and orchestration platform 102, client device 103, or enterprise user device 104 may, in some instances, be special-purpose computing devices configured to perform specific functions.

Referring to FIG. 1B, intelligent call analysis and orchestration platform 102 may include one or more processors 111, memory 112, and communication interface 113. A data bus may interconnect processor 111, memory 112, and communication interface 113. Communication interface 113 may be a network interface configured to support communication between intelligent call analysis and orchestration platform 102 and one or more networks (e.g., network 101, or the like). Memory 112 may include one or more program modules having instructions that when executed by processor 111 cause intelligent call analysis and orchestration platform 102 to perform one or more functions described herein and/or one or more databases that may store and/or otherwise maintain information which may be used by such program modules and/or processor 111. In some instances, the one or more program modules and/or databases may be stored by and/or maintained in different memory units of intelligent call analysis and orchestration platform 102 and/ or by different computing devices that may form and/or otherwise make up intelligent call analysis and orchestration platform 102. For example, memory 112 may have, host, store, and/or include voice interaction metadata extraction module 112a, intelligent voice analyzer module 112b, voice interaction and system telemetry mapping module 112c, call response clustering and scoring module 112d, call response orchestration module 112e, and voice transcript/SOP generation module 112f. Voice interaction metadata extraction module 112a may be configured to extract metadata from live interactions between agents and customers, which may be used to evaluate the live interactions accordingly. Intelligent voice analyzer module 112b may be configured to generate voice spectrograms corresponding to live interactions, which may be used to evaluate agent emotions accordingly. The voice interaction and system telemetry mapping module 112c may be configured to associate voice interactions and telemetry from live interactions to generate a voice event interaction sequence log. The call response clustering and scoring module 112d may be configured to score agent performance during the live interactions to detect relevant deviations. The call response orchestration module 112e may be configured to identify one or more actions to perform based on any detected deviations. The voice transcript/SOP generation module 112f may be configured to generate an updated transcript or SOP based on the detected deviations.

Figure 2A:
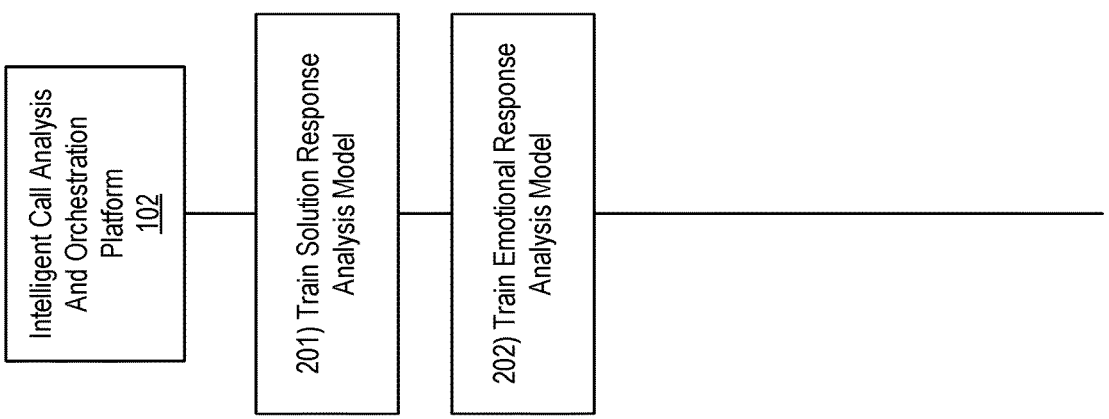
FIGS. 2A-2C depict an illustrative event sequence for using machine learning, generative artificial intelligence, and distributed ledgers to perform intelligent call analysis and orchestration in accordance with one or more example embodiments.
Figure 2B:
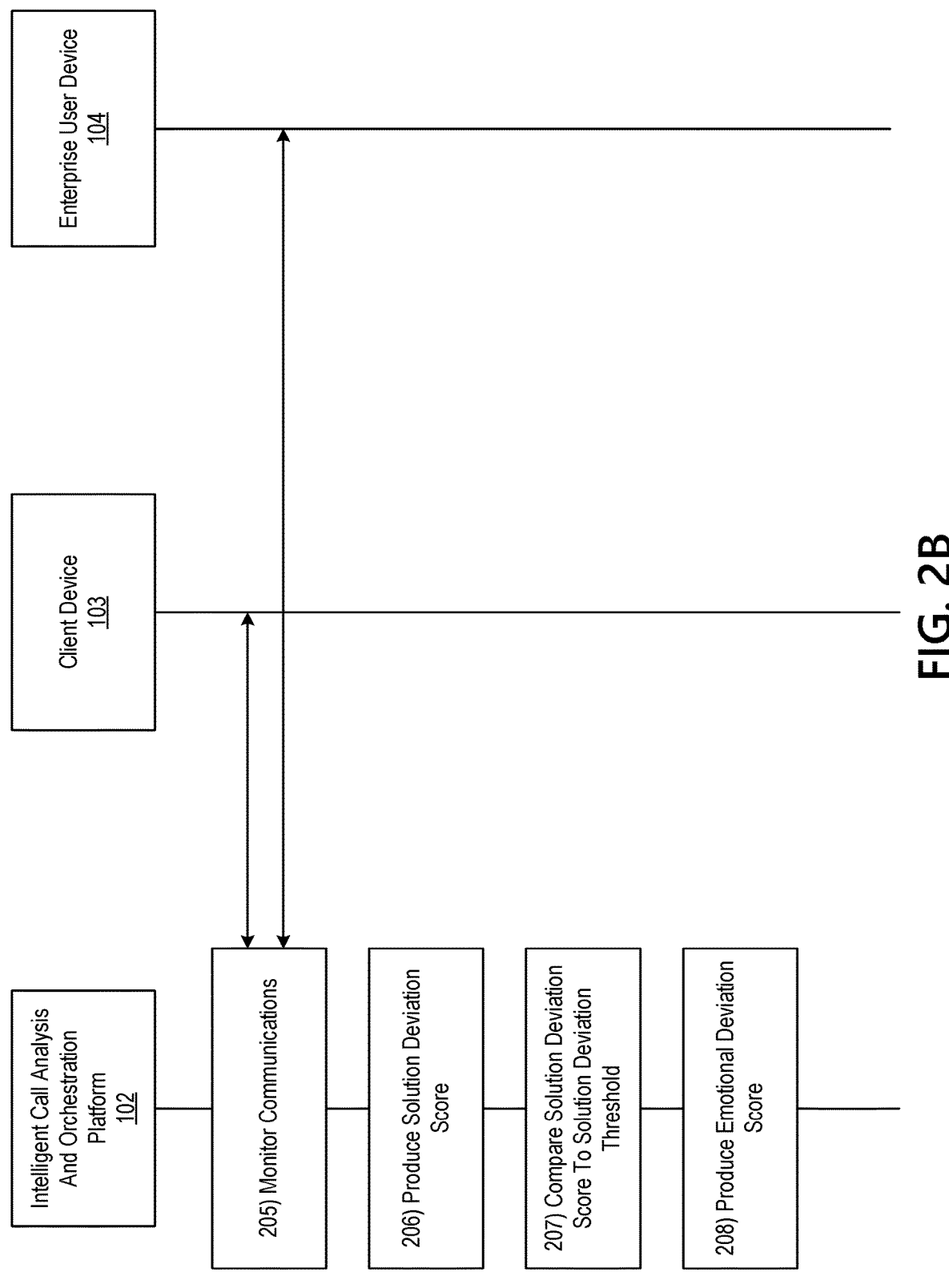
Figure 2C:
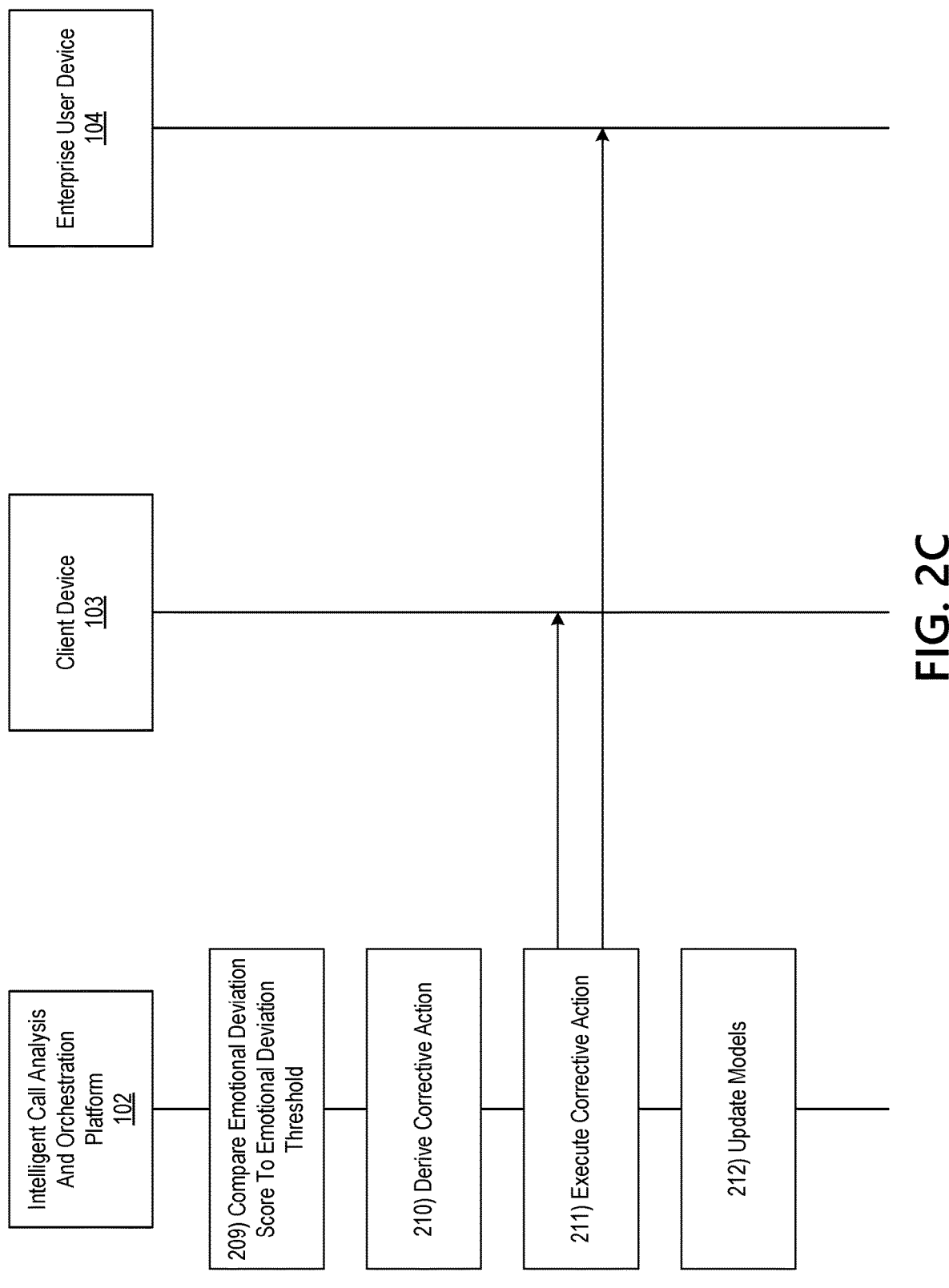
Figure 6:
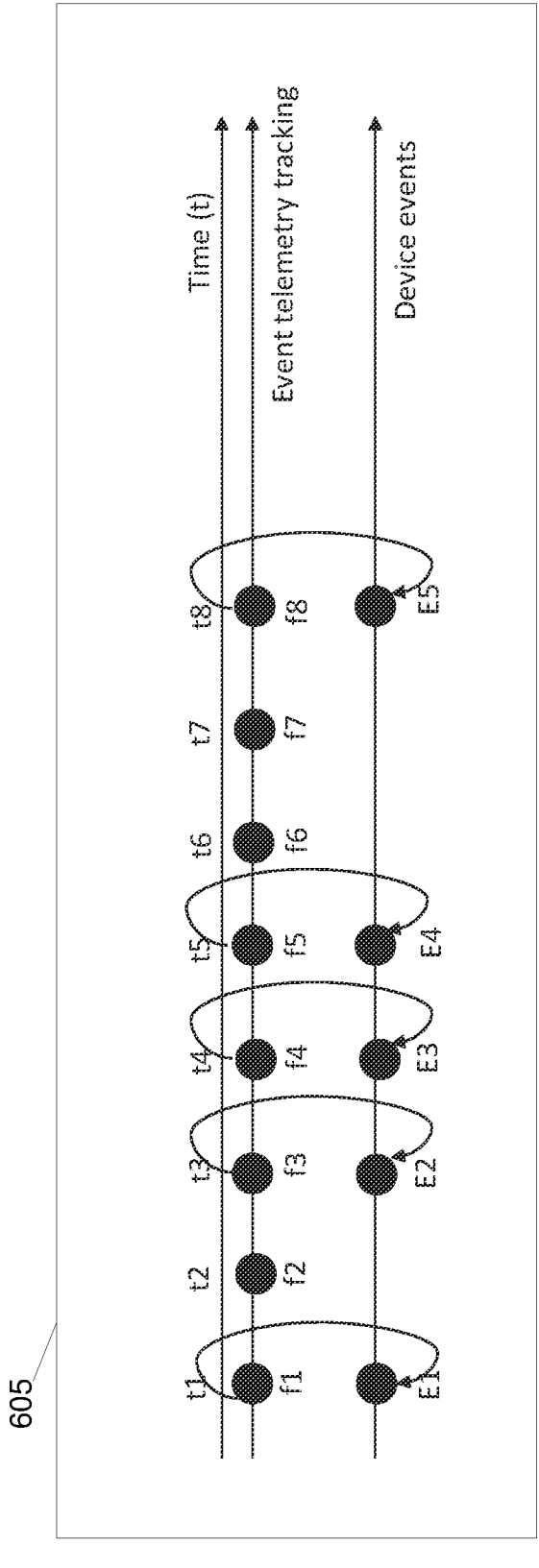
FIG. 6 depicts an illustrative diagram for using machine learning, generative artificial intelligence, and distributed ledgers to perform intelligent call analysis and orchestration in accordance with one or more example embodiments.

FIGS. 2A-2C depict an illustrative event sequence for using machine learning, generative artificial intelligence, and distributed ledgers to perform intelligent call analysis and orchestration in accordance with one or more example embodiments. Referring to FIG. 2A, at step 201, intelligent call analysis and orchestration platform 102 may train a solution response analysis model. For example, the intelligent call analysis and orchestration platform 102 may train the solution response analysis model to identify a solution deviation score (indicating a degree to which performed agent interactions deviate from anticipated agent interactions). For example, intelligent call analysis and orchestration platform 102 may receive historical interaction information such as standard operating procedure (SOP) information, historical agent interaction information, historical call logs, historical telemetry information, voice interaction metadata, and/or other information. In some instances, the intelligent call analysis and orchestration platform 102 may map telemetry information to the voice interaction metadata to produce historical voice event interaction sequence logs (which may, e.g., associate particular telemetry with the corresponding voice interactions, as is illustrated in diagram 605 of FIG. 6). For example, telemetry events may be tracked and logged over time with their corresponding device/voice events.

The intelligent call analysis and orchestration platform 102 may input the historical interaction information into the solution response analysis model to establish stored correlations between such historical interaction information and solution deviation scores. In doing so, the intelligent call analysis and orchestration platform 102 may train the solution response analysis model to identify, based on live interaction information, solution deviation scores.

In some instances, in training the solution response analysis model, the intelligent call analysis and orchestration platform 102 may train a supervised learning model (e.g., decision tree, bagging, boosting, random forest, neural network, linear regression, artificial neural network, support vector machine, deep reinforcement learning model, and/or other supervised learning model), unsupervised learning model (e.g., classification, clustering, anomaly detection, feature engineering, feature learning, and/or other unsupervised learning models), and/or other model.

At step 202, the intelligent call analysis and orchestration platform 102 may train an emotional response analysis model. For example, the intelligent call analysis and orchestration platform 102 may train the emotional response analysis model to identify an emotional deviation score (indicating a degree to which current agent emotions deviate from standard agent emotions, such as a baseline level of stress). For example, intelligent call analysis and orchestration platform 102 may receive historical emotion information such spectrograms and/or other parameters (e.g., intonation, dialect, speech patterns, or the like) representative of historical voice interactions of various individuals. The intelligent call analysis and orchestration platform 102 may input the historical emotion information into the emotional response analysis model to establish stored correlations between such historical emotional information and emotion deviation scores. In doing so, the intelligent call analysis and orchestration platform 102 may train the emotional response analysis model to identify, based on live interaction information, emotional deviation scores.

In some instances, in training the emotional response analysis model, the intelligent call analysis and orchestration platform 102 may train a supervised learning model (e.g., decision tree, bagging, boosting, random forest, neural network, linear regression, artificial neural network, support vector machine, deep reinforcement learning model, and/or other supervised learning model), unsupervised learning model (e.g., classification, clustering, anomaly detection, feature engineering, feature learning, and/or other unsupervised learning models), and/or other model.

At step 203, the client device 103 may establish a connection with the enterprise user device 104. For example, the client device 103 may establish a first wireless data connection with the enterprise user device 104 to link the client device 103 to the enterprise user device 104 (e.g., in preparation for initiating a communication session). In some instances, the client device 103 may identify whether or not a connection is already established with the enterprise user device 104. If a connection is already established with the enterprise user device 104, the client device 103 might not re-establish the connection. Otherwise, if a connection is not yet established with the enterprise user device 104, the client device 103 may establish the first wireless data connection as described herein.

At step 204, the client device 103 and/or the enterprise user device 104 may initiate a communication session with each other. For example, the client device 103 and/or the enterprise user device 104 may establish a voice communication session (e.g., phone call, voice over internet protocol session, video conference, or the like). In some instances, a user of the client device 103 (e.g., a customer) may initiate a communication session with the enterprise user device 104 to obtain assistance from a user of the enterprise user device 104 (e.g., an agent, employee, or the like). For example, the client device 103 and/or the enterprise user device 104 may establish a communication session while the first wireless data connection is established.

Although the communication session is illustrated as being established directly between the client device 103 and the enterprise user device 104, it may in some instances be established via the intelligent call analysis and orchestration platform 102 without departing from the scope of the disclosure. For example, the client device 103 may contact the intelligent call analysis and orchestration platform 102, which may, e.g., route the request to a given agent/employee (e.g., the enterprise user device 104) accordingly.

Referring to FIG. 2B, at step 205, the intelligent call analysis and orchestration platform 102 may monitor the communication session (established at step 204) to identify live interaction information of the communication session. For example, the intelligent call analysis and orchestration platform 102 may collect solution response information such as telemetry information (e.g., indicating interactions of the agent with their computer interface to enter information, select interface elements, navigate interfaces, or the like), context information, communication information, SOP information, voice interaction information, or the like, which may, e.g., be used to identify how accurate the agents responses to the customer are during the communication session.

Additionally or alternatively, the intelligent call analysis and orchestration platform 102 may collect live emotion response information, which may e.g., be used to identify whether or not an agent's emotions may interfere with performance during the communication session. For example, the intelligent call analysis and orchestration platform 102 may produce, in real time, a spectrogram corresponding to the agent performance and emotions (e.g., based on intonation, dialect, stress conditions, a number of sequentially handled calls, and/or other information that may be used to identify an emotional state of the agent).

At step 206, the intelligent call analysis and orchestration platform 102 may produce, based on the solution response information, a solution deviation score. For example, the intelligent call analysis and orchestration platform 102 may use the solution response analysis model to score solutions being proposed by the agent (e.g., responses of the agent to questions from the customer). To do so, the intelligent call analysis and orchestration platform 102 may input, while the communication session is established between the client device 103 and the enterprise user device 104 (e.g., in substantially real time) the solution response information into the solution response analysis model, which may compare the solution response information to anticipated solution response information and score the responses accordingly. For example, the solution response analysis model may identify a score corresponding to a number of correctly answered questions, a degree to which the agent followed a script of a corresponding SOP, an amount of time taken to provide a response, a degree to which the telemetry information of the agent corresponds to anticipated telemetry information (e.g., based on generation and comparison of a voice event interaction sequence log for the communication session to historical voice event interaction sequence logs), and/or otherwise. In these instances, higher scores may indicate higher SOP deviation and/or inaccuracy of a response, whereas lower scores may indicate a lower SOP compliance deviation and/or a more accurate response. For example, a first communication session where more accurate and/or less delayed responses are provided to a customer may be scored lower than a second communication session where less accurate responses and/or more delayed responses are provided to the customer.

At step 207, the intelligent call analysis and orchestration platform 102 may compare the solution deviation score to a solution deviation threshold. In doing so, the intelligent call analysis and orchestration platform 102 may identify whether or not the solution deviation score meets or exceeds the solution deviation threshold.

At step 208, the intelligent call analysis and orchestration platform 102 may produce, based on the emotional response information, an emotional deviation score. For example, the intelligent call analysis and orchestration platform 102 may use the emotional response analysis model to score stress and/or other emotions being experience by the agent during the communication session. To do so, the intelligent call analysis and orchestration platform 102 may input, while the communication session is established between the client device 103 and the enterprise user device 104 (e.g., in substantially real time) the emotional response information into the emotional response analysis model, which may compare the emotional response information to baseline emotional response information for the agent and score the responses accordingly. For example, the emotional response analysis model may identify a score representing how stressed, overwhelmed and/or otherwise compromised an agent may be based on deviation in spectrogram patterns corresponding to the communication session, and/or otherwise. In these instances, higher scores indicate emotional deviation, whereas lower scores may indicate a lower emotional deviation. For example, a first communication session where an agent is more emotional, stressed, and/or otherwise compromised may be scored higher than a second communication session where the agent is less emotional, stressed, and/or otherwise compromised.

Referring to FIG. 2C, at step 209, the intelligent call analysis and orchestration platform 102 may compare the emotional deviation score to an emotional deviation threshold. In doing so, the intelligent call analysis and orchestration platform 102 may identify whether or not the emotional deviation score meets or exceeds the emotional deviation threshold.

If the intelligent call analysis and orchestration platform 102 identifies that at least one of the solution deviation score or the emotional deviation score meets or exceeds the solution deviation threshold or the emotional deviation threshold, respectively, the intelligent call analysis and orchestration platform 102 may proceed to step 210. Otherwise, if the intelligent call analysis and orchestration platform 102 identifies that neither one of the solution deviation score or the emotional deviation score meets or exceeds the solution deviation threshold or emotional deviation threshold, respectively, the intelligent call analysis and orchestration platform 102 may proceed to step 212.

At step 210, the intelligent call analysis and orchestration platform 102 may derive one or more corrective actions to perform based on the live interaction information. For example, the intelligent call analysis and orchestration platform 102 may identify that a system based action and/or an agent based action should be performed. In identifying that an agent based action should be performed, the intelligent call analysis and orchestration platform 102 may generate and provide live feedback to the agent, which may, e.g., assist the agent in providing a response to the customer (e.g., provide a solution to the customer's question, indicate where the solution may be found, and/or other information). In identifying that a system based action should be performed, the intelligent call analysis and orchestration platform 102 may generate an updated SOP, re-route the call to a new agent, update a user interface (e.g., move information to a new tab or subpage of an interface that may be more easily identified by agents, or the like), modify a queue of agents available for assistance, and/or perform other actions. For example, in generating the updated SOP, the intelligent call analysis and orchestration platform 102 may generate a prompt for a generative artificial intelligence (AI) model, which may, e.g., prompt the model to produce the updated SOP, which may then be stored to replace the previously referenced SOP. In these instances, the generative AI model may be one or more of a knowledge graph, a long short term memory (LSTM) model, a transformer model, a generative adversarial networks (GAN) model, or the like. For example, in some instances, in deriving the one or more corrective actions, the intelligent call analysis and orchestration platform 102 may identify that the identified deviation has been detected across more than a threshold number of agents, communication sessions, and/or otherwise. In these instances, the intelligent call analysis and orchestration platform 102 may identify that the SOP should be updated to better equip agents in providing solutions, responses, or the like. In some instances, before replacing a SOP with its corresponding update, the updated SOP may be validated using a blockchain network consent protocol prior to releasing the updated SOP to agents for use.

In some instances, the corrective actions may be selected to address a particular agent or solution deviation detected by the intelligent call analysis and orchestration platform 102. For example, the intelligent call analysis and orchestration platform 102 may maintain correlations between given deviation scores and corresponding corrective actions to perform, and may select/perform corrective actions accordingly.

At step 211, the intelligent call analysis and orchestration platform 102 may execute the corrective action identified at step 210. In some instances, this may involve sending one or more notifications to the client device 103 and/or enterprise user device 104, along with one or more commands which may, e.g., cause the client device 103 and/or the enterprise user device 104 to display the corresponding notification. For example, the enterprise user device 104 may display a graphical user interface similar to the graphical user interface 405 (depicted in FIG. 4), the client device 103 may display a graphical user interface similar to graphical user interface 505 (depicted in FIG. 5), or the like. Additionally or alternatively, the intelligent call analysis and orchestration platform 102 may communicate updated SOPs, interfaces, live assistance/feedback, and/or other information to the enterprise user device 104. In these instances, the intelligent call analysis and orchestration platform 102 may communicate with the enterprise user device 104 via a homomorphic encryption layer.

At step 212, the intelligent call analysis and orchestration platform 102 may update the solution response analysis model and the emotional response analysis model based on the live interaction information, the generated scores, the identified corrective actions, and/or other information. In doing so, the intelligent call analysis and orchestration platform 102 may continue to refine the solution response analysis model and/or the emotional response analysis model using a dynamic feedback loop, which may, e.g., increase the accuracy and effectiveness of the models in detecting deviations in agent performance.

For example, the intelligent call analysis and orchestration platform 102 may use the live interaction information, the generated scores, the identified corrective actions, and/or other information to reinforce, modify, and/or otherwise update the solution response analysis model and/or emotional response analysis model, thus causing the models to continuously improve (e.g., in terms of performance monitoring).

In some instances, the intelligent call analysis and orchestration platform 102 may continuously refine the node selection model. In some instances, the intelligent call analysis and orchestration platform 102 may maintain an accuracy threshold for the solution response analysis model and/or emotional response analysis model, and may pause refinement (through the dynamic feedback loops) of the model if the corresponding accuracy is identified as greater than the corresponding accuracy threshold. Similarly, if the accuracy fails to be equal or less than the given accuracy threshold, the intelligent call analysis and orchestration platform 102 may resume refinement of the models through the corresponding dynamic feedback loop.

Figure 3:
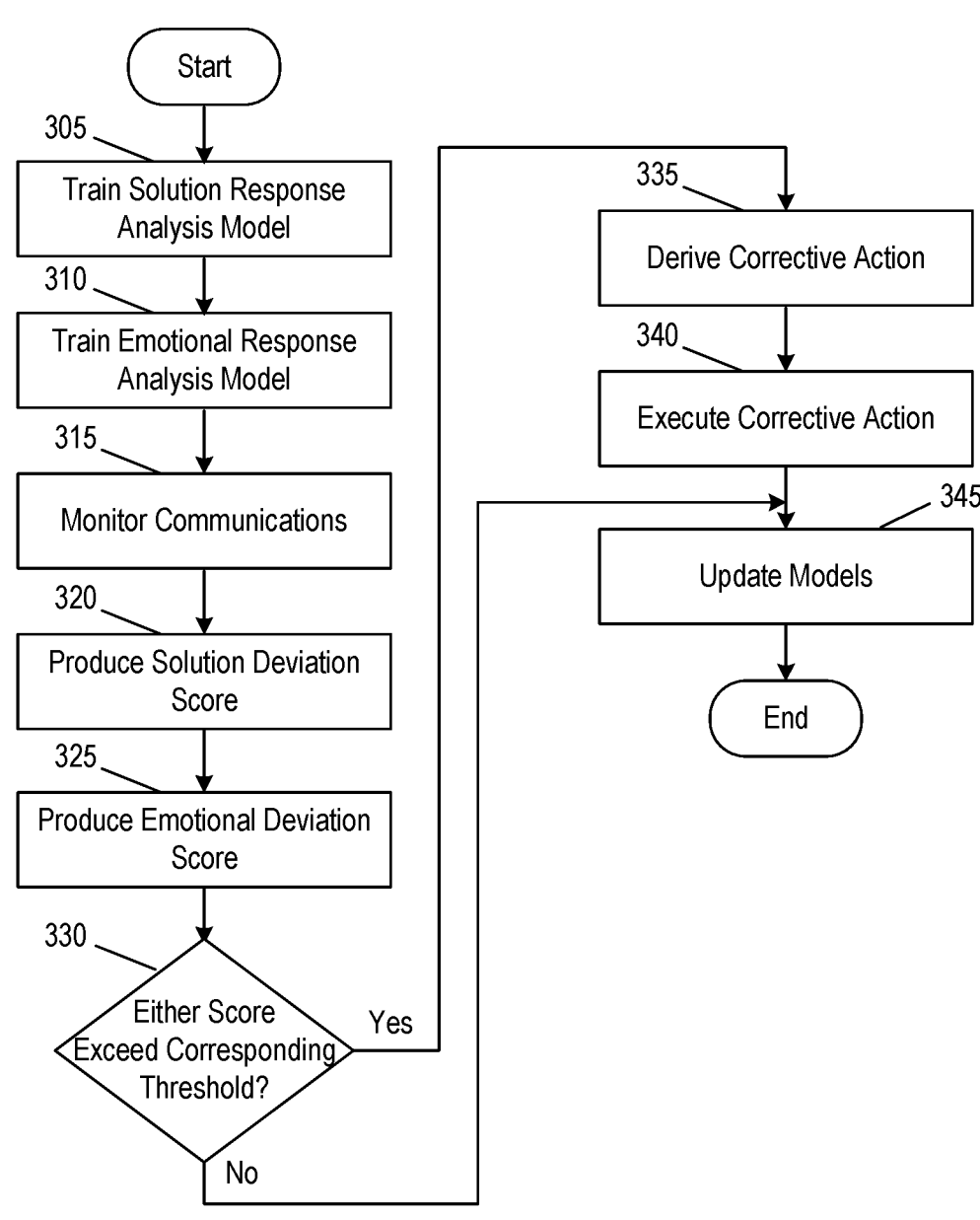
FIG. 3 depicts an illustrative method for using machine learning, generative artificial intelligence, and distributed ledgers to perform intelligent call analysis and orchestration in accordance with one or more example embodiments.

FIG. 3 depicts an illustrative method for using machine learning, generative artificial intelligence, and distributed ledgers to perform intelligent call analysis and orchestration in accordance with one or more example embodiments. At step 305, a computing platform having at least one processor, a communication interface, and memory may train a solution response analysis model. At step 310, the computing platform may train an emotional response analysis model. At step 315, the computing platform may monitor communications between an agent and customer. At step 320, the computing platform may use the solution response analysis model to produce a solution deviation score based on the monitored communications between the agent and the customer. At step 325, the computing platform may use the emotional response analysis model to produce an emotional deviation score based on the monitored communications between the agent and the customer. At step 330, the computing platform may compare the solution deviation score and the emotional deviation score to respective thresholds to identify whether either of the solution deviation score or the emotional deviation score meet or exceed the respective thresholds. If either the solution deviation score or the emotional deviation score does meet or exceed the respective threshold, the computing platform may proceed to step 335. If neither the solution deviation score or the emotional deviation score meets or exceeds the respective threshold, the computing platform may proceed to step 345.

At step 335, the computing platform may derive a corrective action. At step 340, the computing platform may execute the corrective action. At step 345, the computing platform may update the solution response analysis model and/or the emotional response analysis model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;

a communication interface communicatively coupled to the at least one processor; and memory storing computer-readable instructions that, when executed by the at least one processor, cause the computing platform to:

train, using standard operating procedures (SOP) and historical agent response information, a first machine learning model comprising a first neural network, wherein training the first machine learning model configures the first machine learning model to output, based on live interaction information, a solution deviation score indicating a degree to which agents are complying with a corresponding SOP;

train, using voice spectrograms for historical agent interactions, a second machine learning model comprising a second neural network, wherein training the second machine learning model configures the second machine learning model to output, based on the live interaction information, an emotional deviation score indicating an emotional state of a corresponding agent;

detect a live interaction between an agent and a customer;

input information of the live interaction into the first machine learning model and the second machine learning model to produce, via execution of the first neural network and the second neural network, a first solution deviation score and a first emotional deviation score;

compare the first solution deviation score to a solution deviation threshold and the first emotional deviation score to an emotional deviation threshold;

based on detecting that one or more of the solution deviation threshold or the emotional deviation threshold are met or exceeded, initiate one or more corrective actions, wherein:

the one or more corrective actions comprise an agent based action and a system based action, the agent based action comprises providing live feedback to the agent to facilitate the live interaction via a homomorphic encryption layer, wherein use of the homomorphic encryption layer ensures privacy of the live feedback, the system based action comprises updating a first SOP corresponding to the live interaction and updating one or more interface elements corresponding to the live interaction, wherein updating the one or more interface elements comprises moving information to a new tab or subpage of an interface comprising the one or more interface elements, and updating the first SOP comprises:

generating, based on the information of the live interaction, a prompt for a generative artificial intelligence (AI) model, and inputting, into the generative AI model, the prompt, wherein inputting the prompt into the generative AI model causes the generative AI model to produce an updated SOP, wherein the first SOP is replaced by the updated SOP;

update, via a dynamic feedback loop and based on the first solution deviation score and the first emotional deviation score, the first machine learning model and the second machine learning model, wherein the update improves accuracy of the first machine learning model and the second machine learning model in detecting performance deviations, and wherein updating the first machine learning model and the second machine learning model is in response to detecting that the accuracy is less than an accuracy threshold;

compare, after updating the first machine learning model and the second machine learning model, a subsequent accuracy of the first machine learning model and the second machine learning model to the accuracy threshold; and based on detecting that the subsequent accuracy meets or exceeds the accuracy threshold, pause updates to the first machine learning model and the second machine learning model.

2. The computing platform of claim 1, wherein the first machine learning model is further trained using a historical voice event interaction sequence log, wherein historical voice interaction metadata is mapped to historical telemetry information to produce the historical voice event interaction sequence log.

3. The computing platform of claim 1, wherein initiating the one or more corrective actions comprises deriving, based on one or more of the first solution deviation score or the first emotional deviation score, the one or more corrective actions, wherein the one or more corrective actions are initiated to address a particular issue reflected by the first solution deviation score or the first emotional deviation score.

4. The computing platform of claim 1, wherein the agent based action comprises providing live feedback to the agent to facilitate the live interaction.

5. The computing platform of claim 1, wherein the generative AI model comprises one or more of: a knowledge graph, a long short term memory (LSTM) model, a transformer model, or a generative adversarial networks (GAN) model.

6. The computing platform of claim 1, wherein the memory stores additional computer-readable instructions that, when executed by the at least one processor, cause the computing platform to:

identify whether or not a number of agents experiencing a live interaction problem exceeds a predetermined agent threshold, wherein updating the first SOP or the one or more interface elements corresponding to the live interaction comprises updating, in response to identifying that the predetermined agent threshold is exceeded, the first SOP or the one or more interface elements, wherein the one or more corrective actions comprise the system based action.

7. A method comprising:

at a computing platform comprising at least one processor, a communication interface, and memory:

training, using standard operating procedures (SOP) and historical agent response information, a first machine learning model comprising a first neural network, wherein training the first machine learning model configures the first machine learning model to output, based on live interaction information, a solution deviation score indicating a degree to which agents are complying with a corresponding SOP;

training, using voice spectrograms for historical agent interactions, a second machine learning model comprising a second neural network, wherein training the second machine learning model configures the second machine learning model to output, based on the live interaction information, an emotional deviation score indicating an emotional state of a corresponding agent;

detecting a live interaction between an agent and a customer;

inputting information of the live interaction into the first machine learning model and the second machine learning model to produce, via execution of the first neural network and the second neural network, a first solution deviation score and a first emotional deviation score;

comparing the first solution deviation score to a solution deviation threshold and the first emotional deviation score to an emotional deviation threshold;

based on detecting that one or more of the solution deviation threshold or the emotional deviation threshold are met or exceeded, initiating one or more corrective actions, wherein:

the one or more corrective actions comprise an agent based action or and a system based action, the agent based action comprises providing live feedback to the agent to facilitate the live interaction via a homomorphic encryption layer, wherein use of the homomorphic encryption layer ensures privacy of the live feedback, the system based action comprises: updating a first SOP corresponding to the live interaction, ander updating one or more interface elements corresponding to the live interaction, wherein updating the one or more interface elements comprises moving information to a new tab or subpage of an interface comprising the one or more interface elements, and updating the first SOP comprises:

generating, based on the information of the live interaction, a prompt for a generative artificial intelligence (AI) model, and inputting, into the generative AI model, the prompt, wherein inputting the prompt into the generative AI model causes the generative AI model to produce an updated SOP, wherein the first SOP is replaced by the updated SOP;

updating, via a dynamic feedback loop and based on the first solution deviation score and the first emotional deviation score, the first machine learning model and the second machine learning model, wherein the update improves accuracy of the first machine learning model and the second machine learning model in detecting performance deviations, and wherein updating the first machine learning model and the second machine learning model is in response to detecting that the accuracy is less than an accuracy threshold;

comparing, after updating the first machine learning model and the second machine learning model, a subsequent accuracy of the first machine learning model and the second machine learning model to the accuracy threshold; and based on detecting that the subsequent accuracy meets or exceeds the accuracy threshold, pausing updates to the first machine learning model and the second machine learning model.

8. The method of claim 7, wherein the first machine learning model is further trained using a historical voice event interaction sequence log, wherein historical voice interaction metadata is mapped to historical telemetry information to produce the historical voice event interaction sequence log.

9. The method of claim 7, wherein initiating the one or more corrective actions comprises deriving, based on one or more of the first solution deviation score or the first emotional deviation score, the one or more corrective actions, wherein the one or more corrective actions are initiated to address a particular issue reflected by the first solution deviation score or the first emotional deviation score.

10. The method of claim 7, wherein the agent based action comprises providing live feedback to the agent to facilitate the live interaction.

11. The method of claim 7, wherein the generative AI model comprises one or more of: a knowledge graph, a long short term memory (LSTM) model, a transformer model, or a generative adversarial networks (GAN) model.

12. One or more non-transitory computer-readable media storing instructions that, when executed by a computing platform comprising at least one processor, a communication interface, and memory, cause the computing platform to:

train, using standard operating procedures (SOP) and historical agent response information, a first machine learning model comprising a first neural network, wherein training the first machine learning model configures the first machine learning model to output, based on live interaction information, a solution deviation score indicating a degree to which agents are complying with a corresponding SOP;

train, using voice spectrograms for historical agent interactions, a second machine learning model comprising a second neural network, wherein training the second machine learning model configures the second machine learning model to output, based on the live interaction information, an emotional deviation score indicating an emotional state of a corresponding agent;

detect a live interaction between an agent and a customer;

input information of the live interaction into the first machine learning model and the second machine learning model to produce, via execution of the first neural network and the second neural network, a first solution deviation score and a first emotional deviation score;

compare the first solution deviation score to a solution deviation threshold and the first emotional deviation score to an emotional deviation threshold;

based on detecting that one or more of the solution deviation threshold or the emotional deviation threshold are met or exceeded, initiate one or more corrective actions, wherein:

the one or more corrective actions comprise an agent based action and a system based action, the agent based action comprises providing live feedback to the agent to facilitate the live interaction via a homomorphic encryption layer, wherein use of the homomorphic encryption layer ensures privacy of the live feedback, the system based action comprises: updating a first SOP corresponding to the live interaction, and updating one or more interface elements corresponding to the live interaction, wherein updating the one or more interface elements comprises moving information to a new tab or subpage of an interface comprising the one or more interface elements, and updating the first SOP comprises:

generating, based on the information of the live interaction, a prompt for a generative artificial intelligence (AI) model, and inputting, into the generative AI model, the prompt, wherein inputting the prompt into the generative AI model causes the generative AI model to produce an updated SOP, wherein the first SOP is replaced by the updated SOP;

update, via a dynamic feedback loop and based on the first solution deviation score and the first emotional deviation score, the first machine learning model and the second machine learning model, wherein the update improves accuracy of the first machine learning model and the second machine learning model in detecting performance deviations, and wherein updating the first machine learning model and the second machine learning model is in response to detecting that the accuracy is less than an accuracy threshold;

compare, after updating the first machine learning model and the second machine learning model, a subsequent accuracy of the first machine learning model and the second machine learning model to the accuracy threshold; and based on detecting that the subsequent accuracy meets or exceeds the accuracy threshold, pause updates to the first machine learning model and the second machine learning model.

13. The non-transitory computer-readable media of claim 12, wherein the first machine learning model is further trained using a historical voice event interaction sequence log, wherein historical voice interaction metadata is mapped to historical telemetry information to produce the historical voice event interaction sequence log.

14. The non-transitory computer-readable media of claim 12, wherein initiating the one or more corrective actions comprises deriving, based on one or more of the first solution deviation score or the first emotional deviation score, the one or more corrective actions, wherein the one or more corrective actions are initiated to address a particular issue reflected by the first solution deviation score or the first emotional deviation score.

15. The non-transitory computer-readable media of claim 12, wherein the agent based action comprises providing live feedback to the agent to facilitate the live interaction.

* * * * *